United States Patent [19]

Blackmore et al.

[11] Patent Number: 4,567,078
[45] Date of Patent: Jan. 28, 1986

[54] PROCESS AND APPARATUS TO CRIMP FIBRES

[75] Inventors: Phillip W. Blackmore, Camlachie; William T. Fletcher; Terry B. Burn, both of Sarnia, all of Canada

[73] Assignee: Fiberglas Canada Inc., Toronto, Canada

[21] Appl. No.: 649,556

[22] Filed: Sep. 11, 1984

[30] Foreign Application Priority Data

Jul. 3, 1984 [CA] Canada ............ 456851

[51] Int. Cl.⁴ .................. D04H 13/00
[52] U.S. Cl. .................. 428/119; 156/62.2; 156/183; 156/205; 156/207; 156/210; 156/285; 156/474; 428/120; 428/288; 428/289; 428/290; 428/198
[58] Field of Search ............ 428/119, 120, 288, 289, 428/290, 198; 156/62.2, 183, 205, 207, 210, 285, 474

[56] References Cited

U.S. PATENT DOCUMENTS

| | | | |
|---|---|---|---|
| 2,409,066 | 10/1946 | Powell et al. | 156/183 |
| 2,500,690 | 3/1950 | Lannan | 156/183 |
| 3,012,923 | 12/1961 | Slayter | 156/183 |
| 3,135,297 | 6/1964 | Nordberg et al. | 156/250 |
| 3,247,567 | 4/1966 | Hartmann | 28/1 |
| 3,393,985 | 7/1968 | Langlois et al. | 65/9 |
| 3,438,841 | 4/1969 | Zumeta et al. | 428/370 |
| 3,484,916 | 12/1969 | Johnstone | 28/72.2 |
| 3,620,873 | 11/1971 | Ehrreich | 156/250 |
| 3,767,495 | 10/1973 | Miller | 156/72 |
| 3,787,195 | 1/1974 | Kirchheim | 65/9 |
| 3,861,971 | 1/1975 | Stapleford et al. | 156/62.2 |
| 3,905,057 | 9/1975 | Willis et al. | 5/337 |
| 3,999,971 | 12/1976 | Drummond | 65/9 |
| 4,151,023 | 4/1979 | Platt et al. | 156/62.2 |
| 4,158,557 | 6/1979 | Drummond | 65/2 |
| 4,172,174 | 10/1979 | Takagi | 428/288 |
| 4,228,123 | 10/1980 | Marshall | 264/557 |

FOREIGN PATENT DOCUMENTS

909130 9/1972 Canada .

*Primary Examiner*—Marion C. McCamish
*Attorney, Agent, or Firm*—Bell, Seltzer, Park & Gibson

[57] ABSTRACT

A method and apparatus for producing a fibrous material product by advancing a mat of glass fibers arranged in laminations extending at least substantially parallel to opposite major surfaces of the mat along a gap extending between successive driven conveyors which engage the opposite major surfaces of the mat to control the advance of the mat along the gap, and driving the conveyors at progressively slower speeds along the gap so that the laminations are deformed in at least two separate stages into a reorientation in which at least a major portion of the laminations extend across the thickness of the mat. The resulting product has an improved compression strength.

30 Claims, 17 Drawing Figures

PROCESS AND APPARATUS TO CRIMP FIBRES

FIELD OF THE INVENTION

The present invention relates to a method and apparatus for producing a fibrous material product from a mat of glass fibers arranged in laminations extending at least substantially parallel to opposite major surfaces of the mat.

DESCRIPTION OF THE PRIOR ART

It is well known to those skilled in the art that a mat of glass fibers produced by attenuating the glass fibers from spinners in a forming section and depositing the thus-attenuated glass fibers onto a conveyor exhibits a laminar structure, in that the thus-deposited glass fibers tend to assume an orientation in the mat in which the glass fibers form layers or laminations extending generally parallel to the opposite major surfaces of the mat.

It has for a long time been recognized that a glass fiber mat formed in this way has a considerably greater compression strength parallel to its laminations, i.e. parallel to the majority of the glass fibers in the mat, than in a direction at right angles to the laminations.

For this reason, glass fiber mats have in the past been pleated to rearrange the glass fiber laminations so that the latter come to extend across the thickness of the mat. Such pleating is effected by passing a glass fiber mat between successive pairs of upper and lower conveyors driven at successively slower speeds, so that the mat is folded in a corrugated shape, the corrugations being compressed. Thus, a glass fiber mat pleated in this manner exhibits, in side view, glass fiber laminations which have been bent into a corrugated shape and pressed together. U.S. Pat. No. 2,409,066, issued Oct. 8, 1946 to Edward R. Powell et al and U.S. Pat. No. 2,500,690, issued Mar. 14, 1980 to George M. Lannan describe prior art pleating processes.

However, it is a disadvantage of a pleated glass fiber mat that such a mat exhibits an undesirably low bending strength, since the mat tends to break apart between the adjacent pleats or corrugations when subjected to a bending moment.

It has also been proposed, for example in U.S. Pat. No. 3,012,923, issued Dec. 12, 1961 to G. Slayter and Canadian Pat. No. 909,130, issued Sept. 5, 1972 to Gullfiber AB, to cut a laminar glass fiber mat into sections, which are then rearranged and adhered together so that the laminations extend across the thickness of the resulting product.

BRIEF SUMMARY OF THE INVENTION

The present inventors have now found that a mat of glass fibers containing glass fiber laminations can be processed, without pleating the mat and without cutting the mat into sections, so as to deform and rearrange the laminations to provide a product in which at least the major portion of the laminations extend across the thickness of the mat instead of parallel to the opposite major surfaces of the mat.

More particularly, the present invention provides a method of producing a fibrous material product comprising the steps of advancing a mat of glass fibers arranged in laminations extending at least substantially parallel to opposite major surfaces of the mat; impregnating the mat with a heat-curable bonding substance; passing the mat along a gap extending between successive driven conveyors which engage the opposite major surfaces of the mat to control the advance of the mat along the gap; driving the conveyors at progressively slower speeds along the gap so that the laminations of the mat are deformed in at least two separate stages into a reorientation in which at least a major portion of the laminations extend across the thickness of the mat; and subsequently heating the mat to cure the bonding substance.

According to the present invention, there is also provided apparatus for producing a reformed fibrous material product from a mat of glass fiber containing a binder and having glass fiber laminations extending parallel to opposite major surfaces of the mat, the apparatus comprising a plurality of pairs of conveyors spaced apart in succession and defining therebetween a gap, means for driving the conveyors to advance the mat along the gap with the conveyors in engagement with the opposite major surfaces of the mat, the driving means including means for driving successive ones of the conveyors at speeds which are progressively slower in the direction of travel of the mat along the gap to deform the laminations into a reorientation in which a major portion of the laminations extend across the thickness of the mat, and means for heating the mat to cure the binder.

It has been found, in practice, that due to the lengths of the glass fibers, the deformation of the glass fiber laminations cannot be effected satisfactorily in a single stage, since excessive pleating of the glass fiber mat occurCs, but that such excessive pleating can be avoided by initiating the deformation of the laminations at one stage and then completing the deformation in one or more subsequent stages.

Preferably, endless belts are used as the conveyors, the endless belts being arranged in pairs with each successive pair being driven at a speed slower than the preceding pair. Also, each successive pair of the conveyors may be spaced apart by a greater or lesser distance than the preceding pair, in order to allow control of the thickness of the mat as it passes from each pair of conveyors to the next pair.

To counteract pleating of the mat, suitable guide means, for example guide rollers or stationary guide members, are preferably positioned between successive ones of the lower and in some instances the upper endless belt conveyors for contacting and guiding the major surfaces of the mat as the mat passes between the successive conveyors.

As the laminar glass fiber mat passes between the conveyors, the conveyors engage and grip the opposite major surfaces of the glass fiber mat and, due to the progressively slower speeds of the conveyors, the laminations within the thickness of the glass fiber mat are forced forwardly, relative to the opposite major surfaces of the mat, and thus bend and "bunch-up", so that these laminations no longer extend parallel to the opposite major surfaces of the glass fiber mat but form a knit of reoriented laminations between opposite major surfaces thereof.

BRIEF DESCRIPTION OF THE DRAWINGS

The invention will be more readily understood from the following description of preferred embodiments thereof given, by way of example, with reference to the accompanying drawings, in which.

DESCRIPTION OF PREFERRED EMBODIMENTS

Figure 1:
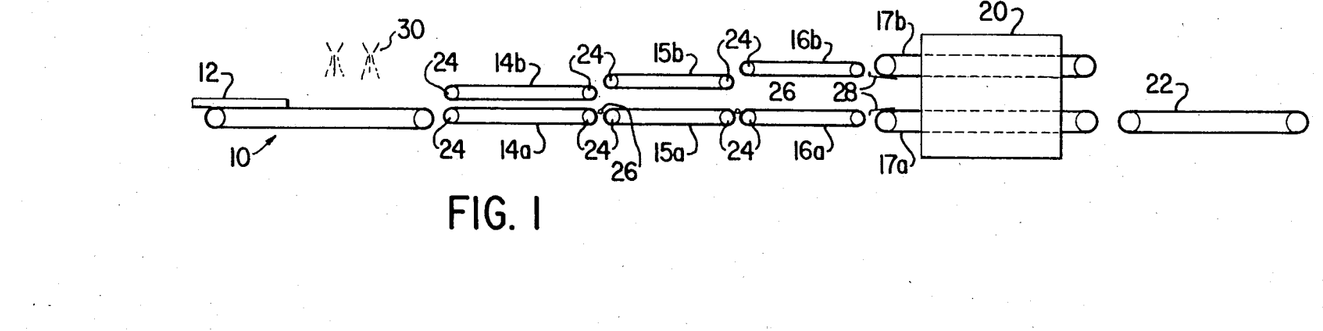
FIG. 1 shows a diagrammatic side view of a proproduction line embodying the present invention for processing a laminar glass fiber mat.

Referring firstly to FIG. 1, the production line illustrated therein has an infeed conveyor indicated generally by reference numeral 10 for receiving a laminar glass fiber mat from a forming section, which is of the type well known in the art and which, therefore, is not illustrated in the present drawings.

From the forming conveyor, the glass fiber mat, indicated by reference numeral 12, is advanced between three successive pairs of endless conveyor belts, indicated by reference nuxerals 14a, 14b, 15a, 15b and 16a, 16b, which are driven by a suitable motor and drive transmission (not shown) and which engage and grip the opposite major surfaces of the glass fiber mat 12.

As can be seen from FIG. 1, the conveyor belts 15a and 15b are spaced apart from one another by a distance which is greater than the spacing of the conveyor belts 14a and 14b from one another, and the conveyor belts 16a and 16b, in turn, are spaced apart from one another by a distance which is greater than the spacing between the conveyor belts 15a and 15b. Thus, the pairs of conveyor belts are spaced apart by progressively increasing distances in succession along the path of advance of the glass fiber belt 12.

This arrangement of spacings is particularly suited to the crimping of relatively thick mat and is therefore described for purposes of illustration only. As will be discussed more fully below, different arrangements of spacings are contemplated, including a smaller spacing between conveyor belts 16a and 16b relative to belts 15a and 15b when crimping relatively thin product.

Beyond the conveyor belts 16a and 16b, a further pair of spaced apart conveyor belts 17a and 17b, are provided for feeding the glass fiber mat 12 through means for heating such as a curing oven indicated generally by reference numeral 20.

The spacing between conveyor belts 17a and 17b will vary depending upon product thickness and will therefore typically approximate the spacing between conveyor belts 16a and 16b.

Beyond the conveyor belts 17a and 17b, a conveyor 22 is provided for conveying the processed and cured glass fiber mat to a cutting section (not shown), at which the mat is cut into sections for wrapping and packaging at a suitable packaging station. The cutting section and the packing station are of conventional construction and operation and, therefore, not illustrated herein.

In operation of this apparatus, the conveyor belts 14a and 14b are driven at the same speed as the conveyor 10.

The conveyor belts 15a and 15b are driven at a speed slower than the conveyor belts 14a and 14b, and the conveyor belts 16a and 16b, in turn, are driven at a speed which is slower than that of the conveyor belts 15a and 15b. The conveyor belts 16a, 16b, 17a, 17b and 22 are driven at the same speed.

As the glass fiber mat 12 passes from the conveyor belts 14a and 14b to the conveyor belts 15a and 15b, and due to the slower speed of the latter, the glass fiber mat, across the thickness thereof between opposite surface layers of the mat, is bunched-up due to the speed differential between the conveyor belts 15a, 15b, on one hand, and the conveyor belts 14a, 14b, on the other hand. Consequently, the laminations of glass fiber in the glass fiber mat 12, which as mentioned above are initially parallel to the opposite major surfaces of the glass fiber mat 12, are bunched-up more or less vertically and, thus, a major portion of these laminations are deformed from their initial, parallel, generally planar orientation to a reorientation in which they are bent so as to be inclined from the longitudinal horizontal center plane of the glass fiber mat 12.

Due to the relatively long lengths of glass fibers, it is found, in practice, that it is not feasible to effect the complete deformation and reorientation of the glass fiber laminations in one stage at the transition between the conveyors 14a and 14b, on one hand, and the conveyors 15a and 15b, on the other hand, since excessively rapid deformation of these glass fiber laminations has a tendency to produce pleating of the glass fiber mat 12.

Therefore, the deformation of the glass fiber laminations is completed in a subsequent, second stage, at the transition between the conveyor belts 15a and 15b, on the one hand, and the conveyor belts 16a and 16b, on the other hand.

It has been found that, using a mat such as the mat 12 which comprises laminations formed from glass fibers, which are relatively long fibers, the deformation and reorientation of a major portion of the laminations should be effected in at least two separate successive stages. However, it is to be understood that the invention is not restricted to a method or apparatus in which the glass fiber lamination deformation is effected in only two such stages but that this deformation may be carried out in three or more stages, depending upon the initial and final thicknesses of the glass fiber mat.

For example, it has been found that, starting with a glass fiber mat 12 having a thickness of one inch, the thickness of the mat is preferably increased to approximately two inches at the first stage, and is subsequently increased to three inches at the third stage. It will be understood, however, that these figures are given by way of example only, and that the thicknesses of the glass fiber mat before and after each stage in the deformation of the glass fiber laminations may vary considerably, depending upon the initial thickness of the glass fiber mat and the relative speeds of the conveyors employed to deform the laminations of the glass fiber mat.

It has been determined empirically that a boardlike product of good commercial quality is obtained when the crimping ratio between conveyor belts 14a and 14b, on the one hand and conveyor belts 16a and 16b on the other hand, falls within the range from 3.0:1 to 4.0:1 and is preferably 3.5:1. By crimping ratio, what is meant is the ratio of the number of incoming linear feet of laminar glass fiber mat to the number of outgoing linear feet of crimped product. Thus, for an overall crimping ratio of 3.5:1, one linear foot of crimped product will result from the input of 3.5 linear feet of undeformed laminar glass fiber mat.

In one embodiment constructed by the applicant to be described in greater detail below, the crimping ratio between conveyor belts 14a and 14b, on the one hand, and conveyor belts 15a and 15b on the other hand is fixed at 1.5:1. The relative speed of conveyor belts 15a and 15b, on the one hand, and conveyor belts 16a and 16b, on the other hand, is then adjusted to produce a crimping ratio therebetween of 2.33:1 resulting in an overall crimping ratio of 3.5:1.

As will be appreciated, the difference between the relative speeds of the successive pairs of conveyor belts closely approximates the crimping ratio therebetween. Thus, for a crimping ratio of 1.5:1, conveyor belts 14a and 14b travel at substantially 1½ times the speed of conveyor belts 15a and 15b.

Although an overall crimping ratio of 3.5:1 appears optimal, ratios may be as high as 6.0:1 or as low as 1.1:1 for more flexible products depending upon the initial and final values of glass fiber mat thickness, the amount of crimping actually required and product constraints.

The conveyor belts 14a-16b are made long enough to grip the glass fiber mat sufficiently to ensure that the laminations are deformed in the above-described manner.

In order to ensure that only a small gap exists between successive conveyor belts, e.g., between the conveyor belts 14a and 15a and between the conveyor belts 14b and 15b, and thus to provide improved control of the deformation of the laminations and to avoid pleating of the glass fiber mat at the gaps between successive conveyor belts, rollers 24 on which the conveyor belts 14a-16b are provided should be of the smallest possible diameter.

In addition, rotatable guide rollers 26 are provided in the gaps between the successive conveyor belts for contacting and guiding the opposite major surfaces of the glass fiber mat as the glass fiber mat passes these gaps.

From the conveyor belts 16a and 16b, the mat is guided by skid plates 28 or perhaps other means such as rollers between the conveyor belts 17a and 17b, which pass the mat through the curing oven 20, at which a suitable binder, initially impregnated into the glass fiber mat 12 by spraying from spray heads 30 located above the conveyor 10, is heated and cured to bind the glass fibers together in a manner well known to those skilled in the art.

Figure 2:
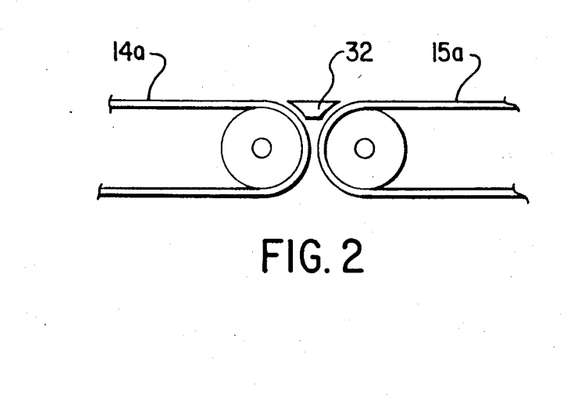
FIG. 2 shows a broken-away view in side elevation of a pair of the conveyor belts of FIG. 1 with a modified guide member therebetween.

FIG. 2 shows a stationary guide 32 inserted into the gap between successive conveyor belts, e.g. conveyor belts 14a and 15a, for engaging and guiding the lower major surface of the glass fiber mat, in place of the corresponding freely rotatable roller 26 of FIG. 1, and it will be appreciated that each of the rollers 26 in FIG. 1 may be replaced by a stationary guide such as the stationary guide 32 of FIG. 2.

Figure 3:
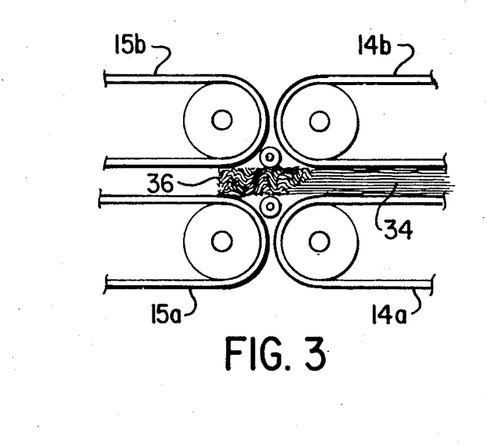
FIG. 3 shows a broken-away view in side elevation of two successive pairs of conveyors and illustrates the deformation of the fiber laminations as the glass fiber mat passes from one pair of the conveyors to the succeeding pair of conveyors.

FIG. 3 illustrates the deformation of the laminations of the glass fiber mat at the first stage, i.e. between the conveyor belts 14a and 14b and the conveyor belts 15a and 15b. As can be seen from FIG. 3, as the glass fiber mat approaches this first deformation stage, the glass fiber laminations, indicated by reference numeral 34, are initially generally planar, horizontal laminations, parallel to the upper and lower major surfaces of the glass fiber mat 12.

As the mat approaches and passes through the gap between two pairs of conveyor belts and travels along the gap between the conveyor belts 15a and 15b, these laminations become increasingly deformed and are reoriented into a pattern of crimps, as indicated by reference numeral 36, wherein at least a major portion of the laminations extend across the thickness of the mat.

Figure 4:
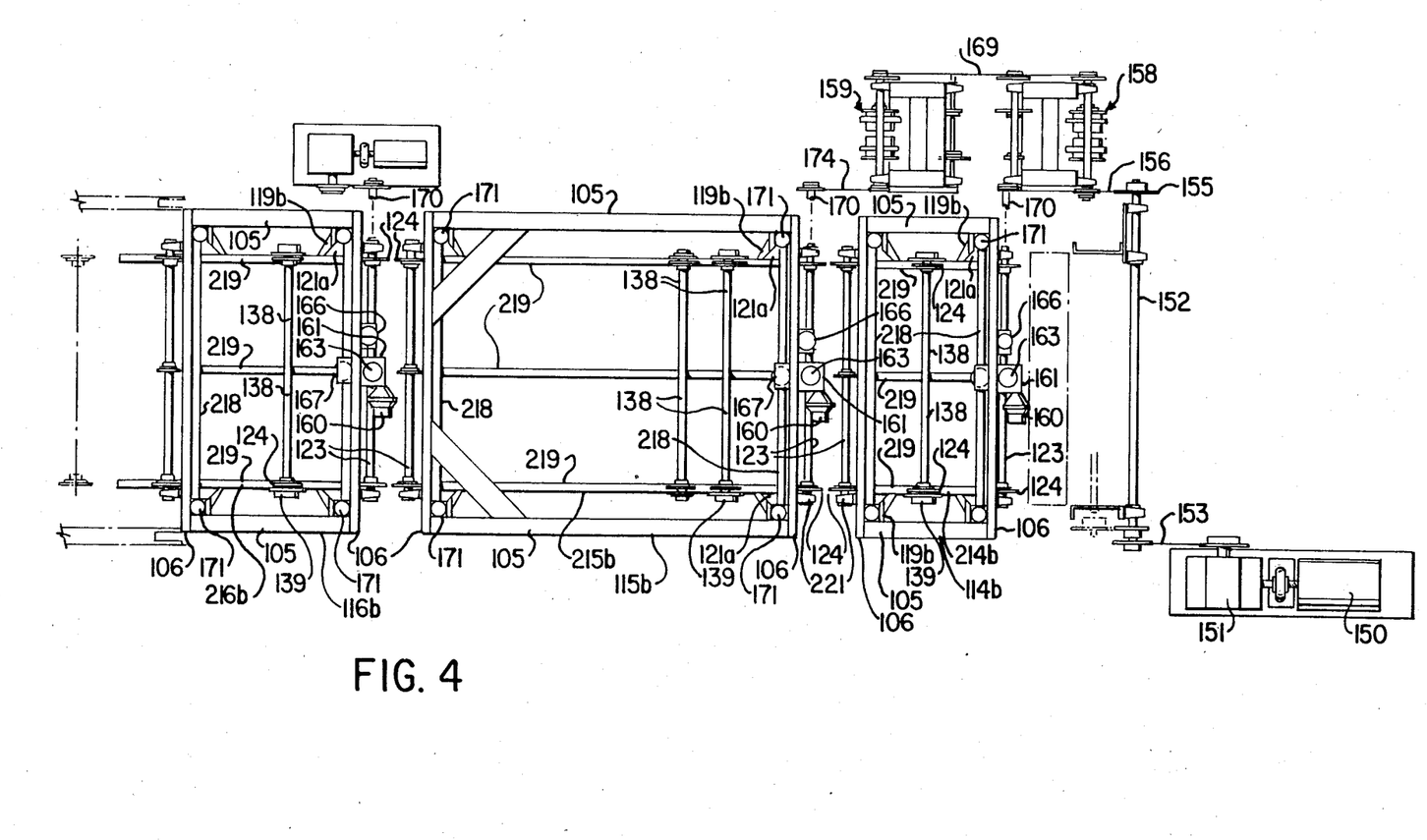
FIG. 4 shows a more detailed plan view of a production line for processing a laminar glass fiber mat.
Figure 5:
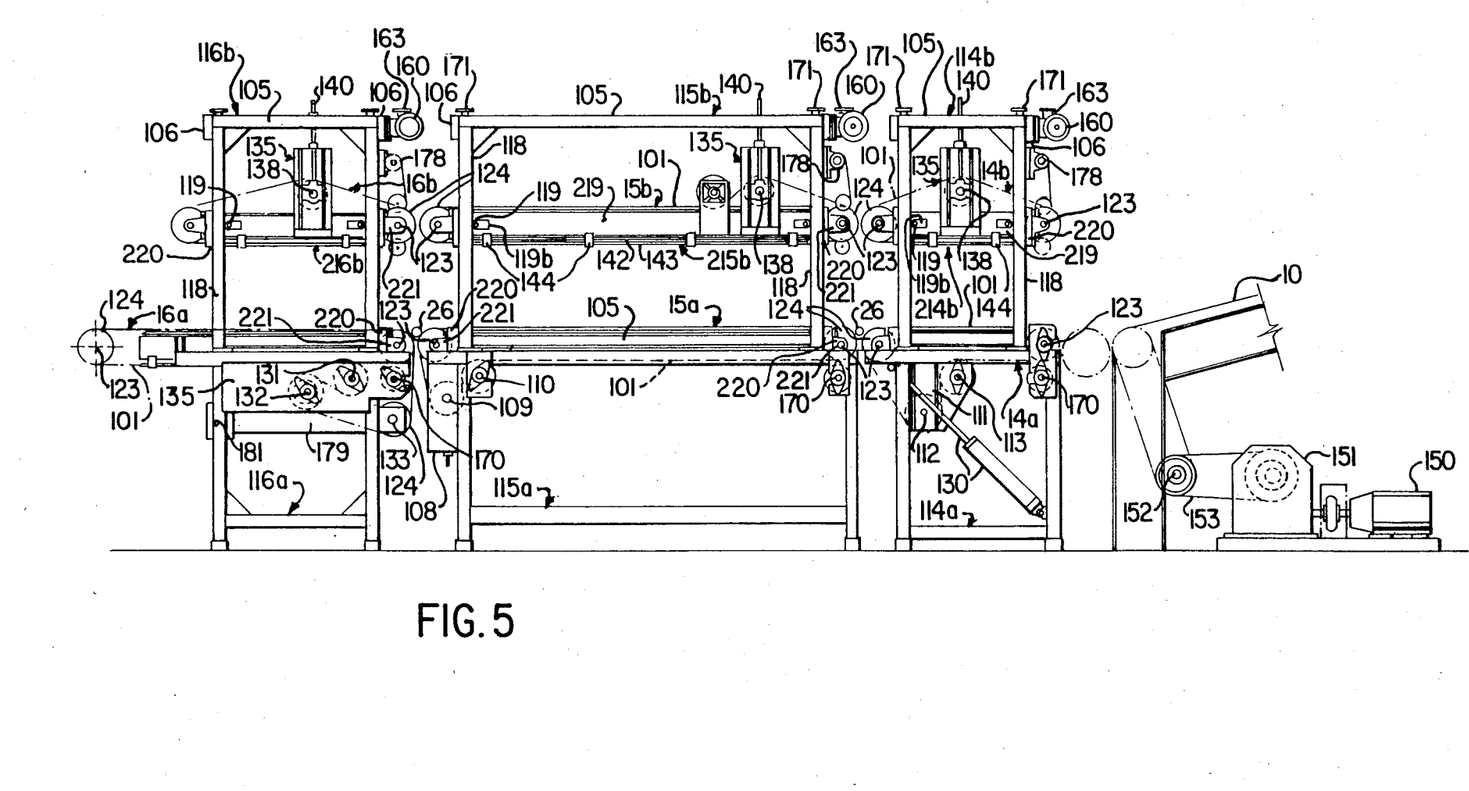
FIG. 5 shows a more detailed side elevational view of the production line of FIG. 4.

FIGS. 4 and 5 are more detailed elevational and plan views of a production line as constructed by the applicant for crimping laminar glass fiber mats. Where appropriate, like reference numerals used in the preceding figures have been used to identify like elements.

The production line as shown consists of an infeed ramp conveyor 10 for delivering glass fiber mat from the forming section (not shown) to the production line consisting of the three successive pairs of conveyor means such as belt conveyors 14a, 14b, 15a, 15b, 16a and 16b. The conveyor belts themselves which will be more fully described below with reference to FIG. 14 may be generally seen in FIG. 14 to comprise a plurality of transversely extending, closely spaced metal slats or flight bars 100 of rectangular cross-sectional configuration provided between endless drive chains 101.

Each of the upper conveyor belts 14b, 15b and 16b is supported for rotation about conveyor assemblies, also simply called conveyors, 214b, 215b and 216b respectively. In the embodiment as shown, each upper conveyor includes in place of rollers 24 shafts 123 having sprockets 124 provided adjacent opposite ends thereof. Sprockets 124 engage drive chains 101 to rotate the conveyor belts.

The construction of each of the upper conveyors is quite similar and the construction of upper conveyor 214b only will therefore be described in greater detail.

Figure 6:
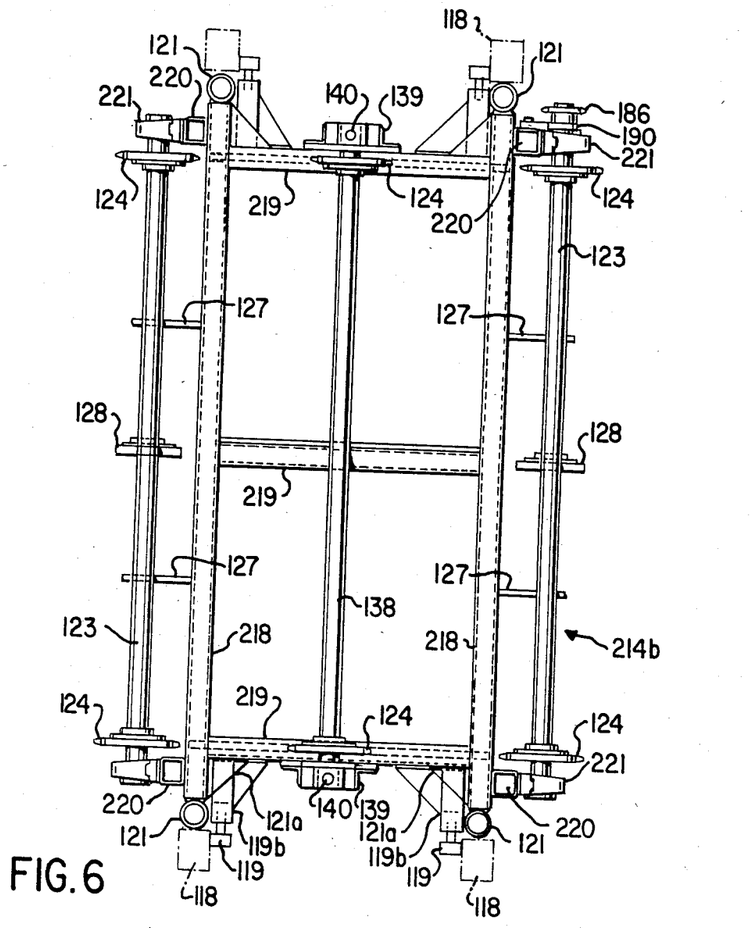
FIG. 6 shows a more detailed plan view of a conveyor assembly for supporting an upper one of said pairs of conveyor belts.
Figure 7:
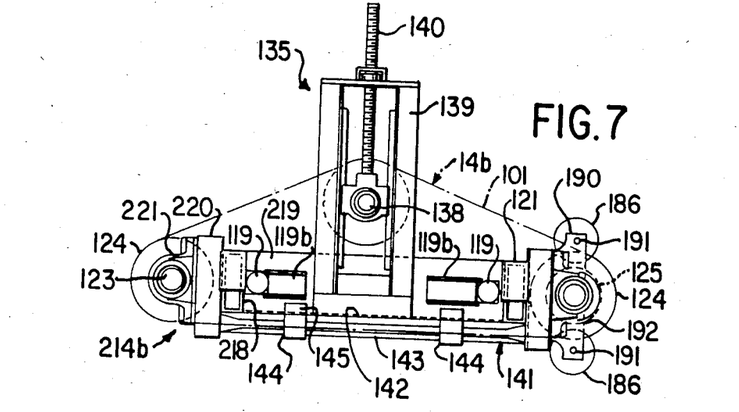
FIG. 7 is a side elevational view of the conveyor assembly of FIG. 6.

With reference to FIGS. 6 and 7, conveyor 214b consists of a framework including frame members 218 and 219. Frame members 219 will sometimes be referred to simply as frames and in the embodiment shown may be in the form of lengths of channel-shaped beams. Welded or otherwise affixed onto the outer surface of each frame member 218 towards the outer ends thereof are pillow-block mounts 220. Each pillow-block mount supports a pillow-block 221 into which is rotatably received a respective end of shaft 123. The shaft 123 shown to the right in FIG. 6 is actually the drive shaft for this conveyor and includes a drive sprocket 125 (FIG. 7) at one end. The shaft shown to the left in the drawing is an idler shaft and of course both shafts include sprockets 124 thereon to engage drive chains 101 to rotate the conveyor belt.

The drive and idler shafts may each include a roller 128 at a midpoint along their respective lengths to lend additional support to the conveyor belt. Intermediate support for shafts 123 themselves may be provided by means of bushed plates or brackets 127.

The conveyor is provided with suitable means for adjusting and maintaining the tension in conveyor belt 14b. These means may include a tensioner indicated generally at 135. Tensioners of this sort are well known in the art and will not therefore be described in great detail although the tensioner will be generally seen to include a take-up shaft 138 having sprockets 124 provided at the ends thereof, take-up mounts 139 which support the ends of the take-up shaft for vertical movement and rotatable jack screws 140 for adjusting the elevation of the take-up shaft to maintain proper tension in conveyor belt 14b.

A track assembly to guide the movements and to prevent undue flopping of conveyor belt 14b as it passes beneath the underside of conveyor 214b is suspended from the undersides of frame elements 214b is suspended from the undersides of frame elements 219.

Figure 8:
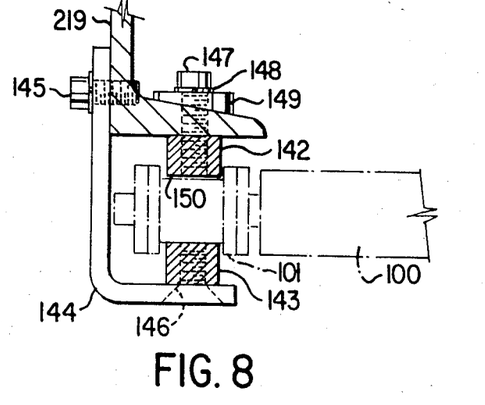
FIG. 8 is a cross-sectional view of a track subassembly for guiding the movement of the conveyor belts supported by the conveyor assembly of FIGS. 6 and 7.

With reference to FIGS. 7 and 8, the track assembly 141 consists of upper and lower track elements 142 and 143 uniformly spaced from one another except at their ends which diverge somewhat by means of an outward thinning of each element. The lower track 143 in particular is supported by two or more L-shaped track supports 144 attached to frame elements 219 such as by means of machine screws 145 or the like. With particular reference to FIG. 8, lower track element 143 is attached to the track supports 144 by means of threaded fasteners 146 and the upper track element 142 is attached to the lower flanges of the outer frame elements 219 by means of a threaded fastener 147, a lock washer 148 and a bevelled washer 149.

The gap 150 between the upper and lower tracks is sized to closely accommodate drive chain 101 to maintain a generally planar motion by constraints on its upward and downward clearances.

To control the gaps between the pairs of conveyor belts, each of conveyors 214b, 215b and 216b is vertically adjustable relative to lower-belts 14a, 15a and 16a. Upper conveyor 214b is mounted for up and down movement on an upper support frame 114b and upper conveyors 215b and 216b are similarly mounted for up and down movement on upper support frames 115b and 116b, respectively. As the construction of each of the upper support frames is substantially identical, it will once again be sufficient to describe upper support frame 114b only and it will be understood that this description will apply to the two other upper support frames as well.

Figure 9:
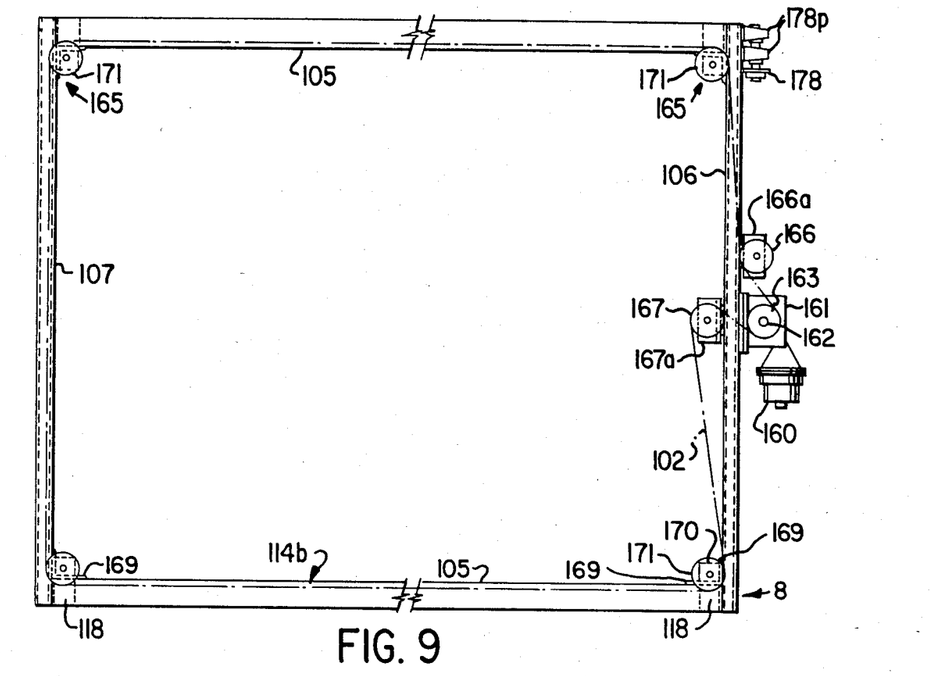
FIG. 9 is a more detailed plan view of an upper support frame for supporting the conveyor assembly of FIG. 6.
Figure 10:
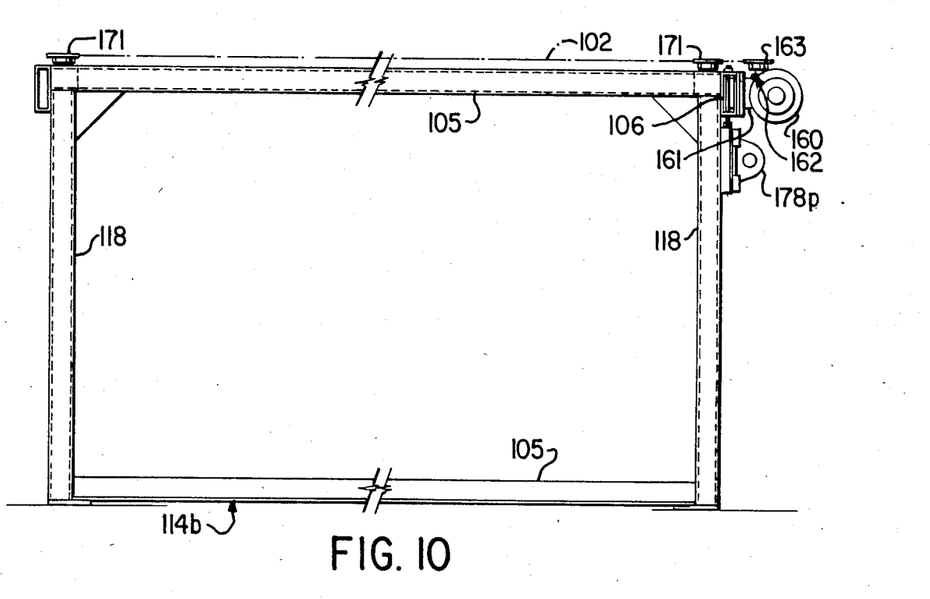
FIG. 10 is a side elevational view of the support frame of FIG. 9.

With reference to FIGS. 9 and 10, upper support frame 114b consists of an essentially rectangular framework of elements including uprights 118, horizontal frame members 105 and end members 106 and 107. As can be seen most clearly from the view of FIG. 5, upper support frame 114b rests atop and is connected to corresponding lower support frame 114a by means of threaded fasteners or the like.

A number of different means of moving the upper conveyors in an up and down fashion will occur to those skilled in the art but in the embodiment shown, an air motor 160 is used to drive screw lift assemblies 165 provided at each of the upper corners of upper support frame 114b. As will be described below, each screw lift assembly includes a threaded lift screw which engages a respective corner of conveyor 214b to raise and lower the conveyor as required.

As will be seen most clearly from FIGS. 9 and 10, air motor 160 is attached to and supported by a gear box 161 bolted to end member 106 for rotating a drive shaft 162 extending upwardly from the gear box and which has a drive sprocket 163 provided at its upper end as shown. A first take-up sprocket 166 supported by a take-up support mount 166a is located on the same side of end member 106 as gear box 161 and a second take-up sprocket 167 supported by a second take-up sprocket mount 167a is located on the other side of end member 106 to be opposite gear box 161. At least one of take-up sprockets 166 or 167 is adjustable in the longitudinal direction of end member 106 for adjusting the tension in a lift screw drive chain 102.

Figure 11:
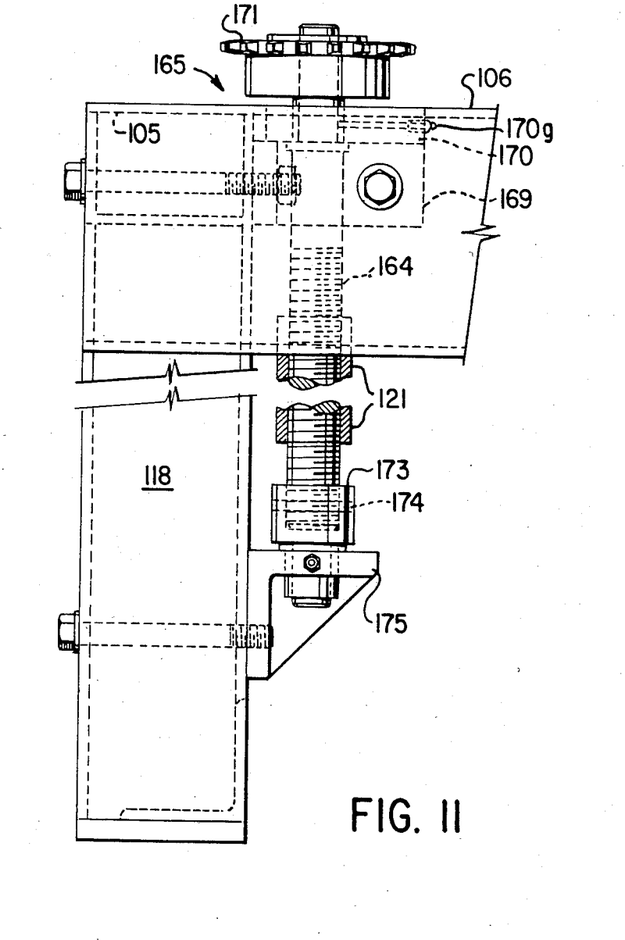
FIG. 11 is a partially sectional, elevational view of a lift screw sub-assembly provided on the support frame of FIG. 9.

The screw lift assemblies will now be described with reference to FIG. 11 which is a view looking in the direction of arrow B shown in FIG. 9. Each screw lift assembly is of the same construction and the following description will be understood to apply to each.

Generally, an L-shaped corner bracket 169 is bolted or otherwise affixed to the corner defined by frame element 105 and end member 106. The bracket includes a bushed flange 170 through which one end of a threaded lift screw 164 is journalled to extend upwardly for connection to a toothed sprocket 171. A grease nipple 170g is provided for lubricating this joint. The lower end of the lift screw 164 is received into a bearing cup 173 and is secured therein by means of a pin 174. An L-shaped bottom bracket 175 is bolted to upright frame member 118 to support the bearing cup.

Lift screw drive chain 102 encircles each of the drive and idler sprockets as best seen in FIG. 9 so that each lift screw is rotated simultaneously and at the same speed to avoid differential adjustments to the elevations of the corners of conveyor 214b.

To effect the raising and lowering of the conveyor, the lift screws pass through correspondingly threaded slug nuts 121 (see also FIG. 6) provided at the outer ends of conveyor frame members 218. The slug nuts are non-rotatably fixed in position and are supported in part by gussets 121a so that rotation of the lift screws is translated into up and down movements of the conveyor depending upon the direction in which the lift screws are turned. Cam rollers 119 provided adjacent each slug nut are positioned to engage the inner surfaces of upright frame members 118 and serve to stabilize the conveyor and to guide its up and down movements. Each cam roller is journalled into a cam roller bracket 119b bolted to conveyor frame members 219 preferably in a manner permitting of some lateral adjustments to the positioning of the cam roller relative to upright 118.

Lower conveyor belts 14a, 15a and 16a are supported by lower support frames 114a, 115a and 116a respectively. Each of these lower support frames generally comprises a rectangular framework of structural members as shown and are essentially similar to one another.

As with the upper support frames, each lower support frame includes at the upper opposite ends thereof pillow block mounts 220 to which are mounted pillow blocks 221. Shafts 123 including toothed drive sprockets 124 adjacent the ends thereof are journalled into the pillow blocks and as with the upper conveyor assemblies, the toothed sprockets 124 engage drive chains 101 to rotate the conveyor belts.

For belt tensioning purposes, lower frame 115a includes a take-up shaft 109 supported for vertical adjustments by take-up mount 108 and an idler shaft 110. Similarly, lower support frame 114a includes a take-up shaft 112 supported for vertical adjustments by take-up mounts 111 and an idler shaft 113.

The take up mechanism for lower support frame 116a is modified somewhat relative to the others in view of the fact that the length of lower conveyor belt 16a is required to be variable. As mentioned above, a further pair of conveyor belts 17a and 17b are provided beyond conveyor belt 16a for feeding the glass fiber mat 12 through curing oven 20. The temperature in the curing oven is sufficiently elevated to result in significant thermal expansion in the lengths of belts 17a and 17b by as much as 12 inches, and the left-most shaft 123 as seen in FIG. 5 must therefore be free to float back and forth to accommodate this expansion. Accordingly, whereas shaft 123 shown to the right on lower support frame 116a is secured in the usual manner by means of pillow block mounts 220 and pillow blocks 221, the ends of shaft 123 shown to the left on lower support frame 116a are received into bearings slidably supported by tracks (not shown) to allow some freedom for back and forth movement of the shaft. The ends of the shaft supporting the adjacent end of belt 17a are similarly supported in the same tracks and are connected to the ends of left-most shaft 123 by means of spacers (also not shown), to maintain constant spacing between belts 16a and 17a. The resulting change of distance between each of shafts 123 of lower support frame 116a due to the push/pull of thermal expansion is accommodated by means of a take-up mechanism including two idler shafts 131 and 132 (as will be described below, shaft 132 is actually a drive shaft for conveyor belt 16a) journalled into bearings mounted onto side plates 135 and a take-up shaft 133. Take-up shaft 133 is journalled into the ends of arms 179 which are pivotable about pivot points 181. Take-up shaft 133 is weight-loaded to maintain tension in drive chain 101 as left-most shaft 123 is moved to the right due to thermal expansion of belt 17a.

In the embodiment shown, the gaps between respective pairs of upper and lower conveyor belts may be adjusted within the range of 1 inch to 24 inches. Gaps of less than 1 inch are possible for thinner products.

Lower conveyor belts 15a and 16a are mounted in horizontal alignment with one another. Lower conveyor belt 14a is supported by lower support frame 114a to be horizontally aligned with lower conveyor belt 15a but is additionally pivotable about its associated shaft 123 closest to infeed conveyor 10. The pivoting movements of lower conveyor belt 14a are controlled by an hydraulic piston and cylinder assembly 130.

Typically, the glass fiber mat delivered from the forming station at the commencement of a run is not of suitable quality and is usually discarded. To this end, lower conveyor belt 14a is pivoted in the counterclockwise direction by piston and cylinder assembly 130 at the commencement of the run whereupon the glass mat leader is dumped beneath lower conveyor belt 15a.

When pivoted like this, conveyor 14a is run at double speed when down to tear pieces from the mat on conveyor 10. When steady state conditions are reached, conveyor belt 14a is pivoted upwards to its horizontal operating position and its speed is reduced to normal.

The successive pairs of conveyor belts are arranged on their respective frames to minimize the spacing therebetween which in the embodiment constructed by the applicant is in the 1 inch range. It is also important to choose sprockets 124 of the minimum possible diameter to further minimize the size of the gaps between successive belts. Sprocket sizes may vary in the 6 inch to 10 inch range depending on conveyor belt sizing requirements with 8 inches being preferred.

Rotatable guide rollers 26 are provided in the spaces between lower successive conveyor belts for guiding the lower major surface of the glass fiber mat over and past the spacings. Similar guide rollers are not provided in the spacings between successive ones of the upper conveyor belts however in view of the typically unequal vertical elevations of the upper conveyors when crimping is occurring, and also as it has been found that the guide rollers over a period of time become tacky due to accretion of the bonding agent applied to the glass fibers and develop a tendency to lift the mat up into the spacing. This can develop to the point where the conveyors become physically jammed and stall the drive mechanism.

In the embodiment constructed by the applicant, guide rollers 26 are driven at the same rotational speed as the successive conveyor belt.

Conveyor belts 14a and 14b and 15a and 15b are driven by the same prime mover used to drive infeed conveyor 10. With reference to FIGS. 4 and 5, a first prime mover 150 such as an electric motor drives infeed conveyor 10 via a suitable gear reducer 151, a jack shaft 152 and interconnecting drive chain 153.

With particular reference to FIG. 4, jack shaft 152 includes a take-off sprocket 155 which connects with a speed-up clutch 158 by means of chain 156. Speed-up clutch 158 is engaged to rotate conveyor belt 14a at double speed when the latter is in its downwardly pivoted position. Speed-up clutch 158 rotates a drive shaft 170 on lower support frame 114b by means of a drive chain 157, and as will be described below, drive shaft 170 is connected to shafts 123 of support frames 114a and 114b to rotate conveyor belts 14a and 14b at the same speed as infeed conveyor 10.

Connected to speed-up clutch 158 by means of a chain 169 is a slow down clutch 159 which drives a drive shaft 170 for conveyor belts 15a and 15b via a drive chain 174. As will become increasingly clear, the drive mechanism for each pair of conveyor belts is somewhat similar and like reference numerals have therefore been used to denote like elements on the frames supporting the belts.

Slow down clutch is continuously engaged to rotate conveyor belts 15a and 15b at approximately two-thirds the speed of conveyor belts 14a and 14b to produce a crimping ratio of 1.5:1 therebetween.

Figure 12:
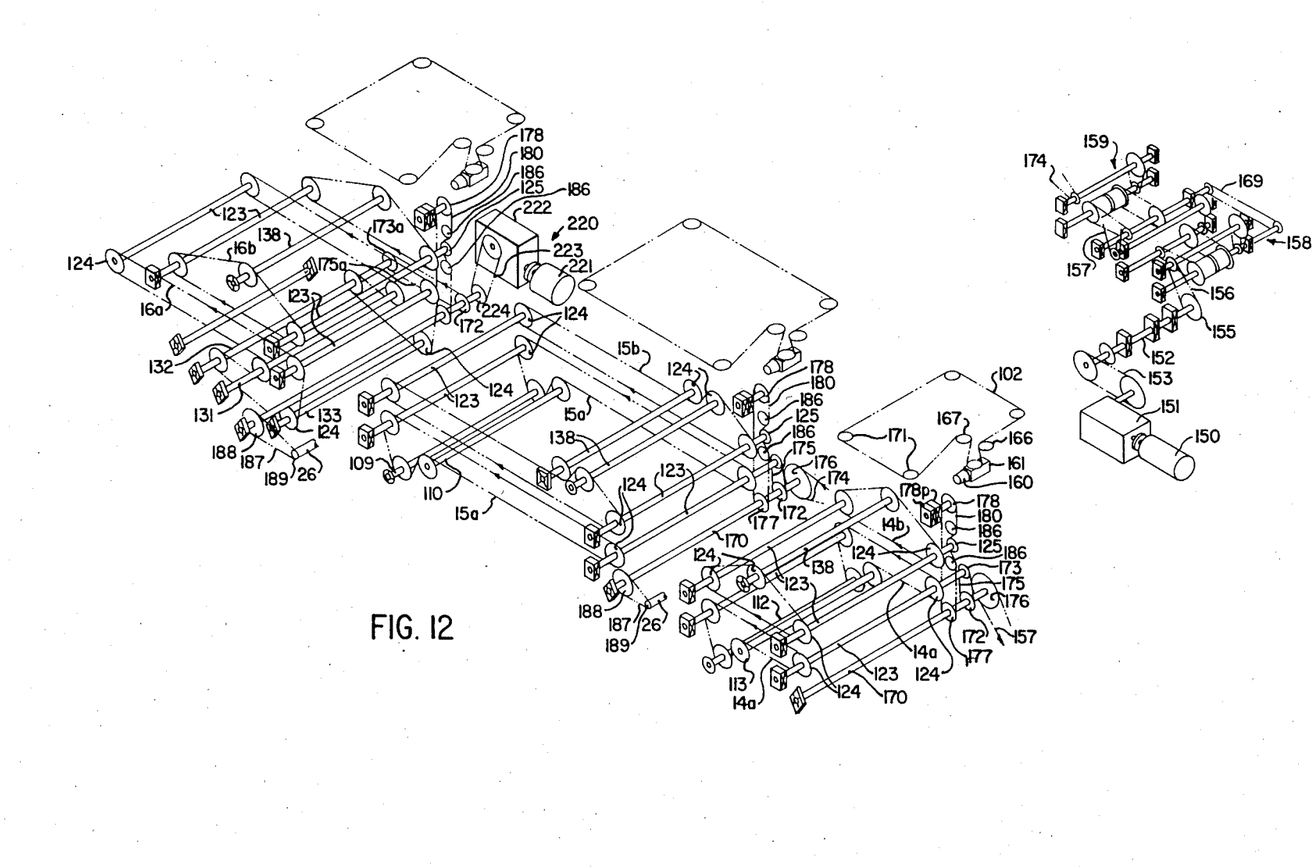
FIG. 12 is a perspective, schematical view of the drive assembly for the production line shown in FIG. 4.

At this point, it will be convenient to refer to FIG. 12 which schematically shows the drive mechanism for the present assembly line and wherein unnecessary elements have been deleted for greater clarity.

As will be seen, drive shaft 170 on lower frame 114a includes at its end a toothed sprocket 176 connected to speed-up clutch 158 by means of chain 157. A second sprocket 172 on shaft 170 is aligned with a sprocket 173 provided at the end of drive shaft 123 of lower support frame 114a to drive conveyor belt 14a by means of a roller chain 175. The rotation of upper conveyor belt 14b is accomplished by means of a third sprocket 177 provided on shaft 170 to align with a roller sprocket 178 journalled into pillow blocks 178p supported on upright 118 of upper support frame 114b. The mounting of roller sprocket 178 is best seen in the views of FIGS. 9 and 10. A roller chain 180 interconnects sprockets 177 and 178 to form a continuous running loop which engages the drive sprocket 125 provided at the end of drive shaft 123 of upper conveyor 214b. A pair of idler sprockets 186 connected to upper conveyor 214b bias roller chain 180 against drive sprocket 125. Idler sprockets 186 are mounted onto an idler plate 190 most clearly illustrated in the views of FIGS. 6 and 7.

With reference to these figures, the idler plate is bolted or otherwise affixed to pillow block mount 220 adjacent drive sprocket 125. The idler plate is apertured at opposite ends for insertion of idler shafts 191 which support idler sprockets 186. An elongated semi-circular recess 192 is formed into the idler plate between the two idler shafts 191 to provide clearance around the end of shaft 123. As will be obvious, idler plate 190 and the idler sprockets connected to it move up and down with upper conveyor 214b.

As mentioned, the drive for conveyor belts 15a and 15b is substantially the same as that just described for conveyor belts 14a and 14b and need not therefore be further described other than with respect to a further sprocket 188 provided at the end of associated drive shaft 170 for rotating roller 26. Roller 26 includes at its adjacent end a sprocket 189 connected to sprocket 188 on shaft 170 by means of a roller chain 187. The sprockets 188 and 189 are sized so that roller 26 is driven at the same speed as lower conveyor belt 15a.

Conveyor belts 16a and 16b are provided with their own second prime mover 220 so that their rotational speeds may be independently varied. Prime mover 220 includes motor 221 and speed reducer 222 connected via drive chain 223 to a drive sprocket 224 mounted on drive shaft 170. Thereafter, the remainder of the drive mechanism is much the same as that already described with respect to conveyor belts 14a and 14b and 15a and 15b with the result that like reference numerals have been used to denote like elements. The one difference that will be noted in the drive of lower conveyor belt 16a is that the second sprocket 172 on drive shaft 170 rotates the shaft 132 rather than shaft 123 of lower conveyor belt 16a. Shafts 132 and 170 are connected by means of a roller chain 175a and a sprocket 173a provided on shaft 132.

The purpose of independently controlling the speed of conveyor belts 16a and 16b is to adjust the crimping ratio between conveyor belts 15a and 15b on the one hand and conveyor belts 16a and 16b on the other hand.

A number of different means of driving the conveyor belts will occur to those skilled in the art and as will therefore be appreciated, the foregoing description of the drive means is merely exemplary and other drive means may be adopted without departing from the scope of the present invention.

The relative lengths of the conveyor belts may for crimping purposes be the same or they may be of different lengths as shown in the drawings. There must of course be sufficient length for the conveyors to adequately engage the opposite major surfaces of the glass fiber mat to cause the bunching up of the fibers. In the embodiment constructed by the applicant, conveyor belts 14a and 14b are approximately four feet in length, conveyor belts 15a and 15b are approximately nine feet in length and conveyor belts 16a and 16b are approximately five feet in length.

In operation, unsuitable mat is initially dumped beneath conveyor 15a. Upper conveyor belts 14b and 15b are adjusted to provide the required gap relative to their lower counterparts depending upon product type and desired thickness and to prevent pleating.

In practice, it has been found that the majority of crimping occurs between conveyor belts 15a and 15b, on the one hand and conveyor belts 16a and 16b on the other hand, the crimping actually occurring towards the downstream end of conveyor belts 15a and 15b.

As might be appreciated, the occurrence of pleating is more of a problem when crimping relatively thin product.

Guide rollers 26 provided in the spacings between the lower conveyor belts assist in preventing pleating. Pleating is further suppressed and prevented by actually adjusting the gap between the pairs of conveyor belts during the commence of the run. This is done by the assembly line operator who observes the mat as it proceeds through the conveyors and is crimped and who then adjusts the gaps as required to prevent pleating. Typically, it is the gap between conveyor belts 15a and 15b which is most frequently adjusted as the gap between conveyor belts 16a and 16b is set with reference to the desired thickness of the end product.

When crimping relatively thick mat, the gap between conveyor belts 15a and 15b is usually narrowed relative to the gap between conveyor belts 16a and 16b and may in fact become narrower than the latter as shown in FIG. 1. When crimping relatively thin mat, which is the more difficult to process, the gap between belts 15a and 15b is widened relative to the gap between conveyor belts 16a and 16b. In all events, the relative widths of the gaps between successive pairs of conveyor belts are adjusted on the basis of the operator's observations until pleating is eliminated and are then maintained, subject to any required minor adjustments, for the balance of the production run.

From conveyor belts 16a and 16b, the crimped product is delivered to the curing oven for heating and curing of the binder to bind the glass fibers together in the known manner.

It is intended that the production line as described herein may form part of and be integrated into an ordinary production line. When not in use for crimping product, the upper conveyor belts 14b, 15b and 16b are simply raised out of the way and the lower belts are run at a uniform speed to convey glass fiber mat in the ordinary way to the curing oven.

It has been observed that crimping occurs predominantly in the intermediate portion of the thickness of the mat between opposite major surfaces of the mat. At the opposite major surfaces themselves, the laminations are less deformed and may even remain substantially parallel to the opposite major surfaces. It is desired to minimize the size of these outer laminar areas to further increase the compressive strength of the product.

Figure 13:
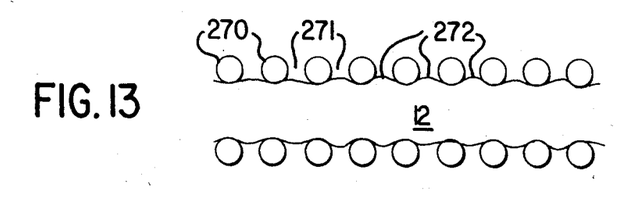
FIG. 13 shows a broken-away view in side elevation of a pair of conveyors and illustrates another type of deformation of the fiber laminations as the glass fiber mat passes between the pair of conveyors.

Conventional conveyor belts consist of closely spaced transversely extending cylindrical rods. With reference to FIG. 13, these rods, identified by reference numeral 270, have gaps 271 therebetween. It is believed that as the glass fiber mat passes between the conveyors, portions of the opposite major surfaces thereof are squeezed into gaps 271 to form nodes 272.

As the mat proceeds through the gap, these nodes are folded over to create what appear to be laminar layers of fibers at the opposite major surfaces of the mat.

Figure 14:
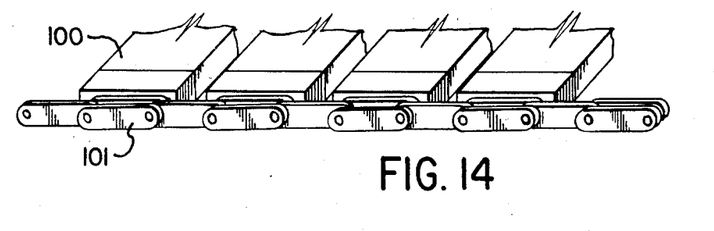
FIG. 14 shows an expanded view of an endless conveyor of a sort suitable for use in processing a laminar glass fiber mat to avoid the deformations illustrated in FIG. 13.

FIG. 14 illustrates an endless conveyor belt for minimizing the formation of nodes. As shown, the cylindrical rods 270 are replaced by flight bars 100 of rectangular cross-sectional shape. This construction obviously minimizes the size of the gaps between the bars and thereby inhibits the formation of nodes. It has been found that use of belts of this construction causes or results in substantial reductions to the thickness of the laminar boundary layers at the opposite major surfaces of the mat.

Figure 15:
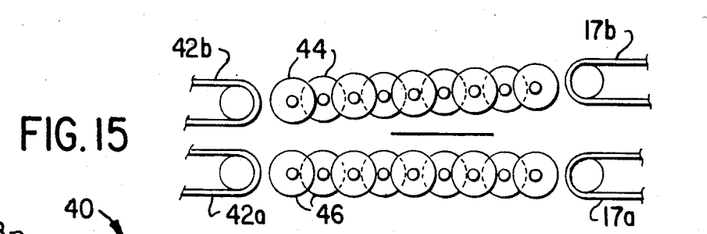
FIG. 15 shows a side view of a modified mat processing conveyor arrangement in which the endless belts of FIGS. 1 to 3 are replaced by an arrangement of rollers.
Figure 16:
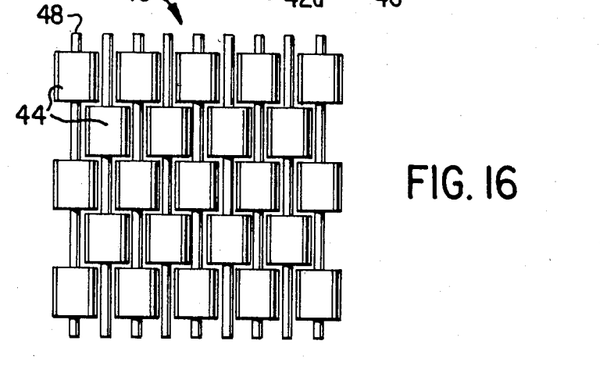
FIG. 16 shows a plan view of the roller arrangement of FIG. 15.

While the conveyors employed for effecting the deformation of the glass fiber laminations in FIGS. 1 and 4 are of a type provided in the form of endless conveyor belts, it is alternatively possible to employ driven conveyor rollers for this purpose and FIGS. 15 and 16 illustrate one suitable form of roller arrangement.

The roller arrangement disclosed in FIGS. 15 ad 16 and indicated generally by reference numeral 40 is provided between an infeed pair of conveyor belts 42a and 42b and the curing oven conveyor belts 17a and 17b, and comprises pairs of upper rollers 44 and corresponding lower rollers 46 arranged in sets on shafts 48. Each shaft 48 of the upper sets of rollers 44 is driven at the same speed as the shaft 48 of the lower sets of rollers 46 immediately below it, and each of the succeeding shafts 48 is driven at a speed slower than that of the preceding shaft 48. Since there are nine pairs of shafts 48, this roller arrangement provides eight stages, i.e. one stage between each pair of shafts 48, at which the glass fiber laminations are progressively deformed until at least a major portion thereof extends in the direction of the thickness of the glass fiber mat.

Figure 17:
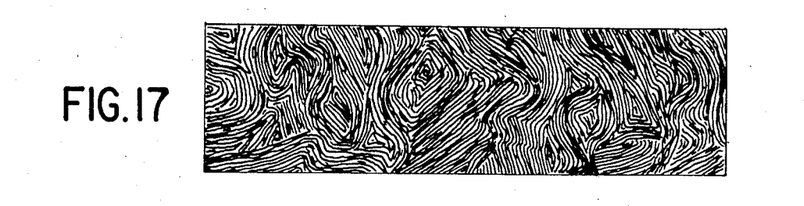
FIG. 17 is a cross sectional view of a section of crimped glass fiber mat.

The deformation of the glass fiber laminations in the above-described manner produces a product which, as will be apparent from the above discussion, exhibits an improved compression strength in a direction perpendicular to its opposite major surfaces. A sample of the crimped product is illustrated in FIG. 17 and as will be seen, a majority of the glass fibre laminations have been reoriented relative to the opposite major surfaces of the mat.

The product is therefore particularly suitable as roof insulation board.

However, the present invention may also be employed with advantage for other glass fiber products requiring enhanced compression strength, for example pipe insulation. It has also been found that wall insulation batts manufactured by the present method and apparatus have the advantage of exhibiting improved recovery of their thickness when released from a compressed, packaged state and can therefore be more compactly packaged, with a consequential reduction of their space requirement for storage and transportation.

The present invention is not restricted to the details or features of the above described embodiments thereof but may be varied within the scope of the following claims.

We claim:

1. A method of producing a non-pleated reoriented glass fiber material having improved bending strength, said method comprising the steps of:

advancing a mat of glass fibers arranged in laminations extending at least substantially parallel to opposite major surfaces of said mat;

impregnating said mat with a heat-curable bonding substance;

passing said mat along a gap extending between successive driven elongate conveyor means which engage the opposite major surfaces of said mat to control the advance of said mat along said gap;

driving said conveyor means at progressively slower speeds along said gap while deforming said laminations of said mat in at least two separate stages into a non-pleated reorientation in which at least a major portion of said laminations extend across the thickness of said mat; and subsequently heating said mat to cure said bonding substance.

2. A method as claimed in claim 1, which includes passing said mat between successive pairs of endless conveyor means, and driving each successive pair of conveyor means at a speed slower than the the preceding pair.

3. A method as claimed in claim 2, which comprises guiding said mat between each of said successive pairs of conveyor means to prevent pleating of said mat.

4. A method as claimed in claim 3, which comprises adjusting the size of the gap between said successive pairs of endless conveyor means to prevent pleating of said mat.

5. A method as claimed in claim 4, wherein the crimping ratio between opposite ends of said gap falls in the range 1.1:1 to 6:1.

6. A method as claimed in claim 4, wherein the crimping ratio between opposite ends of said gap falls in the range from 3.0:1 to 4.0:1.

7. A method as claimed in claim 1, which includes allowing the thickness of said mat to change as said mat travels along said gap.

8. A method as claimed in claim 1, which includes effecting the deformation of said laminations progressively in at least two separate stages at positions spaced apart along said gap.

9. A method as claimed in claim 1, which includes effecting the deformation of said laminations progressively in at least two separate stages at positions spaced apart along said gap and permitting the thickness of the mat to increase at at least one of said stages.

10. A method as claimed in claim 1, which includes effecting the deformation of said laminations progressively in at least two separate stages at first and second positions spaced apart along said gap and permitting the thickness of the mat to increase at said first position and to decrease at said second position.

11. A method of producing a fibrous material product comprising the steps of:

advancing a mat of glass fibers arranged in laminations extending at least substantially parallel to opposite major surfaces of the mat;

impregnating said mat with a heat-curable binder;

passing said advancing mat along a gap extending between successive driven conveyor means which engage opposite major surfaces of the mat to control the advance of the mat along said gap;

driving said conveyor means at progressively slower speeds at positions spaced apart along said mat so that the laminations of said mat are deformed, in at least two successive stages, from their initial orientation into a reorientation in which at least a major portion of said laminations extend across the thickness of the mat; and subsequently heating the mat to cure said binder.

12. A method as claimed in claim 11, in which said conveyors at opposite ends of said gap are driven at a speed ratio of from 6:1 to 1.1:1, the final thickness of said mat being approximately 1 inch to 8 inches.

13. A method as claimed in claim 12, wherein said speed ratio is from 3:1 to 4:1.

14. A method as claimed in claim 11, in which at least one of said conveyor means is outwardly inclined relative to said gap in the direction of advance of said mat along said gap.

15. A method as claimed in claim 11, in which said conveyor means are endless belt conveyors and which includes guiding said opposite major surfaces of said mat between successive ones of said endless belt conveyors.

16. A method as claimed in claim 11, in which said conveyors comprise a plurality of rollers arranged in rows alternately staggered across the width of said gap.

17. Apparatus for producing a non-pleated reoriented glass filing material having improved bending strength from a mat of glass fiber containing a binder and having glass fiber laminations extending parallel to opposite major surfaces of said mat, said apparatus comprising:

a plurality of pairs of elongate conveyor means spaced apart in succession and defining therebetween a gap;

means for driving said conveyor means to advance said mat along said gap with said conveyor means in engagement with said opposite major surfaces of said mat;

said driving means including means for driving successive ones of said conveyor means at speeds which are progressively slower in the direction of travel of said mat along said gap to deform said laminations into a non-pleated reorientation in which a major portion of said laminations extend across the thickness of said mat; and means for heating said mat to cure said binder.

18. Apparatus as claimed in claim 17, including means between successive ones of said conveyor means for guiding said opposite major surfaces of said mat without deformation of said opposite major surfaces between each of said conveyors and the next succeeding one of said conveyors.

19. The apparatus of claim 17 comprising three pairs of said conveyor means, each of said pairs including an upper and lower conveyor means.

20. The apparatus of claim 19 wherein said gap between each upper and lower conveyor means is adjustable.

21. The apparatus of claim 19 wherein said upper conveyor means are independently supported for up and down movement relative to said lower conveyor means.

22. The apparatus of claim 21 wherein said drive means include a first prime mover for driving the second of said pairs of conveyor means, as determined with reference to said direction of flow, at a slower speed relative to the first of said pairs of conveyor means.

23. The apparatus of claim 22 wherein said drive means further include a second prime mover for driving the third of said pairs of conveyor means at a slower speed relative to the second of said pairs of conveyor means.

24. The apparatus of claim 23 wherein the speed of said third of said pairs of conveyor means is adjustable to produce between said first and third of said pairs of conveyor means a speed ratio from 6:1 to 1.1:1.

25. The apparatus of claim 24, including means between successive ones of said lower conveyor means for guiding said mat without deformation between each of said pairs of conveyor means and the next succeeding one of said pairs of conveyor means, said guide means comprising a rotatable roller disposed between successive ones of said lower conveyor means to be level therewith.

26. The apparatus of claim 24, including means between successive ones of said lower conveyor means for guiding said opposite major surfaces of said mat without deformation of said opposite major surfaces between each of said pairs of conveyors and the next succeeding one of said pairs of conveyors.

27. The apparatus of claim 23 wherein the speed of said third of said pairs of conveyor means is adjustable to produce between said first and third of said pairs of conveyor means a speed ratio from 3.0:1 to 4.0:1.

28. The apparatus of claim 23, wherein said conveyor means comprise endless belts of closely spaced bars of rectangular cross-sectional shape arranged parallel to one another in a direction perpendicular to the direction of travel of said mat along said gap.

29. The apparatus of claim 23, wherein said conveyor means comprise endless belts of closely spaced metallic bars of rectangular cross-sectional shape arranged parallel to one another in a direction perpendicular to the direction of travel of said mat along said gap.

30. A fibrous material product formed from a laminar mat of glass fiber containing a heat-cured bonding substance, said material having fiber laminations which have been rearranged from an initial orientation, in which said laminations extend generally parallel to opposite major surfaces of said mat, to a reorientation in which at least a major portion of said laminations extend across the thickness of said mat, said major portion of said laminations extending across the thickness of said mat forming an intermediate layer of said mat between opposite major surfaces of said mat.

* * * * *